United States Patent [19]

Marti

[11] 3,761,749

[45] Sept. 25, 1973

[54] DISK FOR SINGLE-DISK MAGNETIC CLUTCHES

[75] Inventor: Willi Hermann Marti, Basel, Switzerland

[73] Assignee: Delmoran AG, Basel, Switzerland

[22] Filed: Dec. 6, 1971

[21] Appl. No.: 205,213

[30] Foreign Application Priority Data
Dec. 15, 1970   Switzerland .................... 18574/70

[52] U.S. Cl. .................................................. 310/78
[51] Int. Cl. ............................................. H02k 7/10
[58] Field of Search ................. 310/78, 75, 76, 92, 310/96, 100; 192/18 B, 107 M; 188/218 XL, 251 R, 251 A, 251 M, 264 B

[56] References Cited
UNITED STATES PATENTS

| | | | |
|---|---|---|---|
| 3,589,485 | 6/1971 | Kajitani | 310/78 |
| 2,387,050 | 10/1945 | Bell | 310/78 |
| 3,177,998 | 4/1965 | Rossez | 188/251 M |
| 3,270,846 | 9/1966 | Arledter | 192/107 M |
| 3,390,750 | 7/1968 | Albertson | 188/251 M |
| 3,619,676 | 11/1971 | Kawakami | 310/78 |
| 3,664,472 | 5/1972 | Martini | 192/107 M |
| 3,493,796 | 2/1970 | Siegel | 310/76 |

Primary Examiner—R. Skudy
Attorney—Michael S. Striker

[57] ABSTRACT

A disk-shaped armature for use in single-disk magnetic friction clutches has a disk-shaped body of iron which carries one or two friction generating facings consisting of sintered metal or metallic gauze impregnated with a synthetic plastic lubricant, such as polytetrafluorethylene. The facings extend beyond the end faces of the body and can form part of relatively thick rings which are recessed into the respective end faces or they may be applied to a single light metal ring which surrounds the body or to discrete light metal rings which are recessed into the respective end faces of the body.

8 Claims, 4 Drawing Figures

PATENTED SEP 25 1973 3,761,749
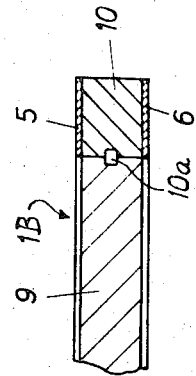
FIG.2
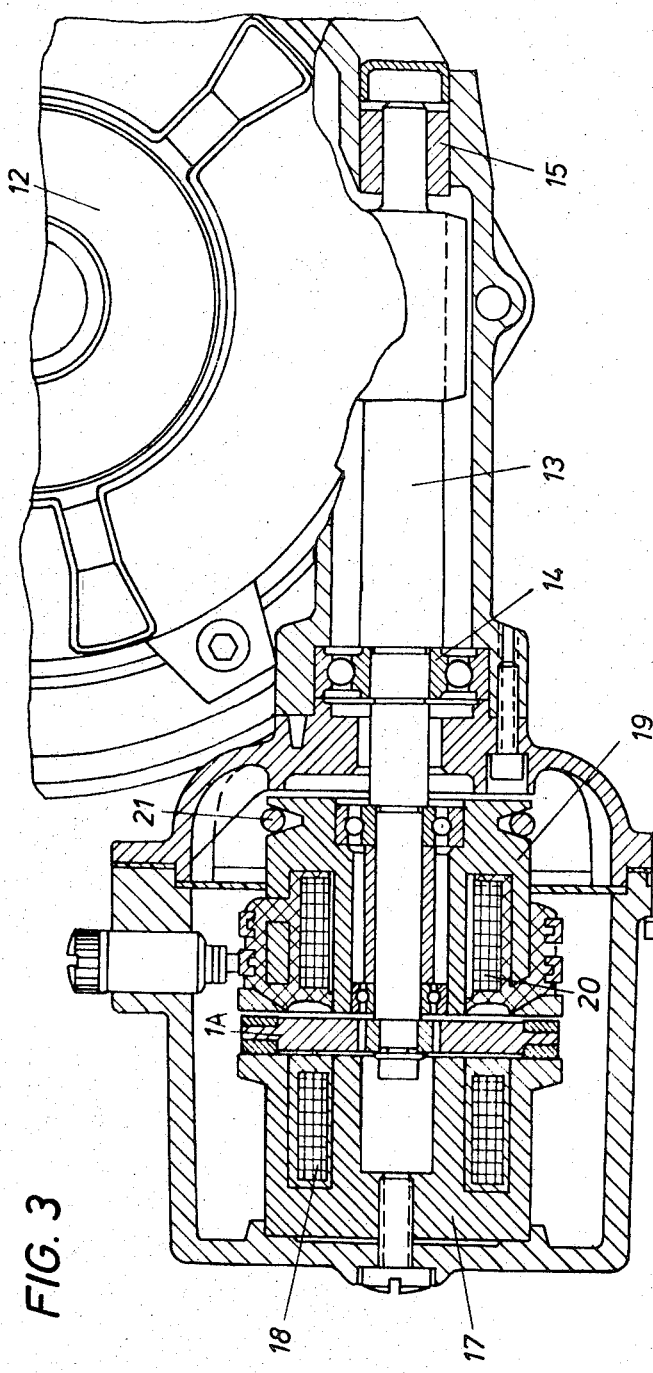
FIG.3
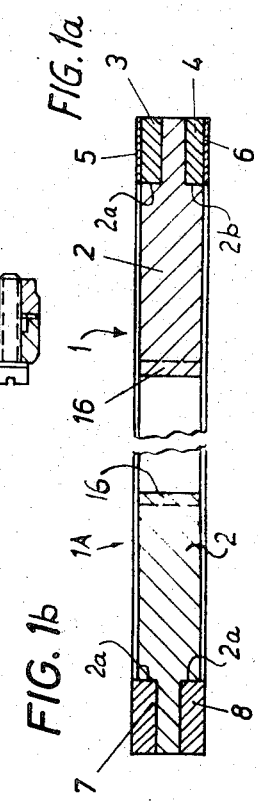
FIG.1a
FIG.1b

DISK FOR SINGLE-DISK MAGNETIC CLUTCHES

BACKGROUND OF THE INVENTION

The present invention relates to magnetic clutches in general, especially to single-disk magnetic friction clutches, and more particularly to improvements in disk-shaped armatures which are utilized in such clutches to effect an acceleration or deceleration of one or more rotary parts, such as shafts or the like. Single-disk magnetic friction clutches can be utilized with advantage in positioning or adjusting motors, for example, in motors of the type shown in FIGS. 1 to 3 of German Pat. No. 1,159,745 and the corresponding U.S. Pat. No. 3,174,450.

It is already known to provide a single-disk magnetic friction clutch with a disk-shaped armature which comprises a disk-shaped body of magnetically conductive material and one or more friction generating facings which are applied to the end faces of the magnetically conductive body. As a rule, presently known facings consist of ring-shaped pieces of cork impregnated with oil or a heat-resistant grease. A drawback of such facings is that they are likely to undergo deformation when the clutch is in use; thus, the thickness of a cork ring increases substantially in response to a rise in temperature. Moreover, a cork ring is likely to undergo permanent deformation in response to the application of abrupt mechanical stresses. Still further, the wear on a cork ring is quite pronounced so that the width of air gaps between a facing in the form of a cork ring and the part against which the facing is caused to move in response to energization of a winding varies as the wear on the facing progresses. A relatively wide air gap is undesirable when the clutch is to react with little delay in response to energization of its winding or windings. Still further, a clutch wherein the air gap between the disk-shaped armature and the part against which the armature must move in response to energization of a winding is relatively wide must furnish substantial magnetic forces. Relatively short switching times (i.e., the length of the interval which elapses between the energization or deenergization of a winding and the movement of the facing on a disk-shaped armature into or from engagement with a driven part and/or into and from engagement with a driving part) are very important in many machines which employ magnetic friction clutches. In positioning or adjusting motors of the tppe disclosed in the aforementioned German Pat. No. 1,159,745, the qualtiy of the switching action can be expressed and the reciprocal value of the product of braking time and the accuracy of braking action. Such quality of the switching action depends to a considerable extent on the length of time which is required to change the position of a disk-shaped armature.

SUMMARY OF THE INVENTION

An object of the invention is to provide a disk-shaped armature, particularly for use in single-disk magnetic friction clutches, which can stand substantial mechanical and/or thermal stresses without appreciable changes in its dimensions, which can stand long periods of use without appreciable wear, and which can be used with advantage in clutches serving to furnish extremely short switching times.

Another object of the invention is to provide novel and improved friction generating facings which can be used in armatures of the just outlined character and whose useful life, resistance to mechanical deformation and resistance to volumetric changes as a function of temperature changes is much more satisfactory than that of presently known facings.

A further object of the invention is to provide an armature whose inertia is less than the inertia of presently known armatures and which can be provided with one or more facings, depending upon the intended use of the clutch which embodies the armature.

An additional object of the invention is to provide a magnetic friction clutch wherein the width of the air gap between the disk-shaped armature and the part or parts against which the armature is caused to move in response to energization of one or more windings is only a small fraction of the air gap in presently known magnetic friction clutches, and wherein the width of such air gap remains at least substantially unchanged after long periods of use of the armature.

The invention resides in the provision of a disk-shaped armature (hereinafter called disk) which can be used with particular advantage in single-disk magnetic friction clutches. The disk comprises a rotary body consisting of iron or another suitable magnetically conductive material, and at least one friction generating facing which extends beyond one surface of the magnetically conductive body. The facing comprises a metallic carrier (such as a sintered metal or a metallic gauze) for a synthetic plastic lubricant, such as polytetrafluorethylene, which preferably permeates the carrier. For example, the carrier may consist of sintered bronze or bronze gauze and may form a ring which extends beyond one end face of a disk-shaped magnetically conductive body. The ring-shaped facing may be applied to a light metal ring which is recessed into the one end face of the body, to a light metal ring which surrounds the disk-shaped body, or such facing may form part of a relatively thick ring which is recessed into the one end face of the body so that only a small portion thereof extends beyond the respective end face.

The novel features which are considered as characteristic of the invention are set forth in particular in the appended claims. The improved disk itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1a is a fragmentary axial sectional view of a disk which embodies one form of the invention;

FIG. 1b is a similar fragmentary axial sectional view of a second disk;

FIG. 2 is a similar fragmentary axial sectional view of a third disk; and

FIG. 3 is an axial sectional view of a single-disk magnetic friction clutch embodying a disk of the type shown in FIG. 1b.

DESCRIPTION OF THE PREFERRED EMBODIMENTS

The disk 1 of FIG. 1a comprises an annular disk-shaped body 2 of magnetically conductive material, preferably iron, the two end faces of which are provided with ring-shaped recesses 2a, 2b for two aluminum rings 3, 4. The peripheral surfaces of the rings 3, 4 are flush with the peripheral surface of the body 2. The exposed end faces of the disks 3, 4 are provided with thin ring-shaped friction generating facings 5, 6 which can be glued or otherwise secured to the respective rings. The facings 5, 6 consist of a metallic carrier, for instance bronze gauze which is permeated with a synthetic plastic lubricant, such as polytetrafluorethylene The width of the facings 5, 6 as considered in the radial direction of the body 2, preferably equals the width of the respective rings 3, 4 and their thickness is in the range of a small fraction of one millimeter, e.g., 0.1 mm and normally not more than 0.5 mm. The internal surface of the body 2 is provided with axially parallel splines 16.

The disk 1A of FIG. 1b comprises a body 2 of iron which is also provided with splines 16 and recesses 2a, and 2b. These recesses receive rings 7, 8 which consist of sintered bronze containing polytetrafluorethylene. The thickness of the rings 7, 8 exceeds the depth of the recesses 2a, 2b as considered in the axial direction of the body 2, so that portions of the rings 7, 8 extend beyond the respective end faces of the body 2 and constitute facings analogous to the facings 5, 6 of FIG. 1a. For example, the thickness of those portions of the rings 7, 8 which extend beyond the respective end faces of the body 2 may be in the range of 0.1–0.5 mm. The disk 1A of FIG. 1b is simpler and less expensive than the disk of FIG. 1a. On the other hand, the useful life of the disk 1 is normally longer than that of the disk 1A. Moreover, the overall weight and hence the inertia of the disk 1 is less than that of the disk 1A because the rings 3, 4 consist of light metal. Low inertia is desirable when the disk is used in clutches which are to accelerate or decelerate a rotary component with minimal losses in time.

The disk 1B of FIG. 2 comprises a magnetically conductive annular disk-shaped body 9 which is surrounded by a ring 10 of aluminum or another light metal. The ring 10 is secured to the disk body 9 by one or more keys 10a or analogous connecting means. The end faces of the ring 10 are provided with ring-shaped facings 5, 6 which are glued or otherwise securely bonded thereto and which may consist of bronze gauze permeated with polytetrafluorethylene, the same as the rings 5, 6 of FIG. 1a. The weight of the disk 1B is even less than that of the disk 1 so that a clutch using the disk 1B can accelerate or arrest a driven component within an extremely short period of time. The peripheral surfaces of the facings 5, 6 are preferably flush with the peripheral surface of the light metal ring 10 and their thickness may be in the range of one or more tenths of a millimeter. The internal surface of the disk body 9 is provided with axially parallel splines, not shown.

FIG. 3 illustrates a single-disk magnetic friction clutch which embodies the disk 1A of FIG. 1b. This clutch constitutes or forms part of an auxiliary control means for a positioning or adjusting motor of the type disclosed in German Pat. No. 1,159,745. The auxiliary control means can compel, by way of a worm shaft 13, a rotary brake disk not shown in FIG. 3 of a clutch motor 12 to rotate at a relatively low speed. The worm shaft 13 is journalled in antifriction bearings 14, 15 and its left-hand end portion, as viewed in FIG. 3, is provided with splines which mate with the splines 16 of the disk 1A. Thus, the disk 1A is free to move axially but shares all angular movements of the worm shaft 13.

One end face of the disk 1A is adjacent to a stationary housing member 17 which contains a braking winding 18. The other end face of the disk 1A is adjacent to a driving member 19 here shown as a pulley which receives torque from the motor 12 or from an auxiliary motor (not shown) by way of one or more belts 21. The driving member 19 accommodates a winding 20.

When the winding 18 is energized in a manner not forming part of the present invention, the disk 1A is attracted to the housing member 17 and causes a practically instantaneous stoppage of the worm shaft 13 by way of the splines 16. If the winding 20 in the driving member 19 is energized, the disk 1A moves axially in a direction to the right, as viewed in FIG. 3, and is attracted to the member 19 so that the shaft 13 is practically instantaneously accelerated to the speed of the member 19.

It was found that the facings 5, 6 or the facing formed by the aforediscussed portions of the rings 7, 8 can stand much longer wear than conventional facings of cork or the like. Moreover, the volumetric changes of the improved facings in response to changes in temperature are much less pronounced than those of cork facings, i.e., the swelling of the facings 5, 6 or 7, 8 in response to heating is negligible. This feature, in addition to greatly reduced wear, renders it possible to mount the improved disk with minimal clearance, i.e., with extremely narrow air gaps, to thus reduce the length of time which is necessary to attract the disk to a stationary braking or housing member or to a rotary driving member in response to energization of the respective winding. Also, the width of the selected air gaps varies very little in response to extended use of the clutch so that the switching times remain stable for long periods of time.

The energy which is converted into heat, especially when the improved disk is caused to engage the braking or housing member 17, can be readily dissipated because the parts which constitute and/or carry the facings consist of a metallic material. Moreover, the coefficient of friction of the facings on the improved disk varies very little or not at all when the temperature of the disk changes. Still further, the facings of the improved disk can stand substantial mechanical stresses or impacts without any appreciable deformation. The selected air gap can be extremely narrow due to the volumetric stability of the facings and also because the facings employ a synthetic plastic lubricant in a permeable metallic carrier. The clutch which embodies the improved disk can operate with relatively small magnetic forces because the width of the air gap or gaps can be reduced well below that of air gaps in clutches having disks which are provided with conventional facings.

It is clear that the clutch of FIG. 3 can employ the disk 1 or the disk 1B as well as that the disk which is used in the clutch can merely serve to couple the shaft 13 to the braking or housing member 17 or to the driving member 19. In such clutches, the disk can be provided with a single facing or only one of the two facings is in actual use whereas the other facing serves as a spare facing to be put in use after extensive wear upon the one facing. Also, the facing or facings may employ another synthetic plastic material with satisfactory lubricating characteristics.

Without further analysis, the foregoing will so fully reveal the gist of the present invention that others can, by applying current knowledge, readily apart it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A disk-shaped armature, particularly for use in single-disk magnetic friction clutches, comprising a rotary disk consisting of magnetically conductive material and having a pair of end faces, at least one of which is provided with a ring-shaped recess; a light metal ring in said recess; and a friction generating facing extending beyond said one end face of said disk and comprising a metallic carrier for a synthetic plastic lubricant, said facing being supported by said light metal ring.

2. An armature as defined in claim 1, wherein said metallic carrier is permeated with said lubricant.

3. An armature as defined in claim 1, wherein said lubricant is polytetrafluorethylene.

4. An armature as defined in claim 1, wherein said metallic carrier is a sintered metal.

5. An armature as defined in claim 1, wherein said carrier is a metallic gauze.

6. An armature as defined in claim 1, wherein said carrier consists of bronze.

7. An armature as defined in claim 1, wherein said facing is a ring which extends slightly beyond said one surface of said disk.

8. A disk-shaped armature, particularly for use in single-disk magnetic friction clutches, comprising a rotary disk having two end faces and consisting of magnetically conductive material; at least one friction generating facing extending beyond one of said end faces of said disk, said facing comprising a metallic carrier for synthetic plastic lubricant; and a light metal ring surrounding said disk and supporting said facing.

* * * * *